June 19, 1951 F. L. KIDWELL 2,557,295
LENS MARKER
Filed March 21, 1949
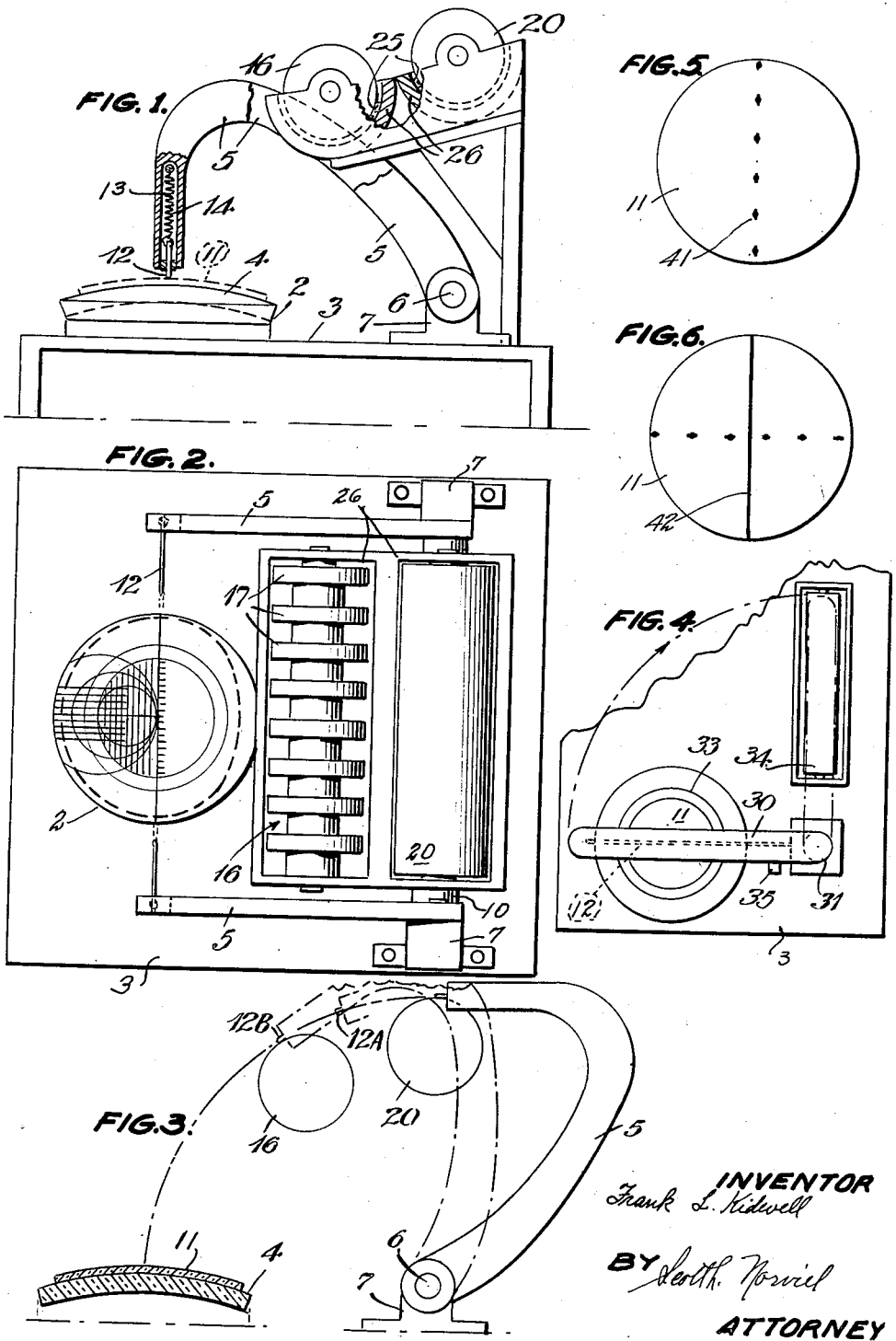
INVENTOR
Frank L. Kidwell
BY
ATTORNEY Patented June 19, 1951

2,557,295

UNITED STATES PATENT OFFICE 2,557,295

LENS MARKER

Frank L. Kidwell, Phoenix, Ariz.

Application March 21, 1949, Serial No. 82,643

5 Claims. (Cl. 101—41)

This invention pertains to lens markers for use in marking optical lenses for grinding.

In grinding lenses for eye glasses and the like, particularly those having bifocal insertions, the lens has heretofore been marked by hand with a fountain pen or the like to provide dotted lines indicating the vertical axis, which may be of one curvature, and the cross curve, which may be of another curvature, according to the prescription. The centers of these two curves are always separated 90°. However, the axis is not always vertical relative to the lens mounting, and this again depends upon the prescription. Further, the axis is not always in the center of the blank, but may be positioned to the right or left relative to the center of the bifocal insert.

As a rule, all grinding is done on the concave side of the blank. After the axis and cross-curve lines are marked with ink dots, they are transferred to the grinding block and the mechanism of the grinding machine set to grind the required curves according to the marked axis line and later, the cross curve line.

In view of the foregoing, one of the objects of this invention is to provide a machine for marking lens blanks much more accurately and rapidly than can be done by hand.

Another object is to provide a machine having means for holding and centering a lens blank with its outer curvature exposed, and with a pedestal for support of the lens blank arranged with indicia so the location of the bifocal insert is clearly indicated, and having mechansim for automatically inking a marking tape or thread to produce either a dashed or solid line, as desired, and then applying the ink to the lens at a predetermined angle, rapidly and accurately.

Other objects will appear hereinafter.

I attain the foregoing objects by means of the devices and particular construction shown in the accompanying drawings in which—

Figure 1 is a side elevation of a lens marker incorporating my improvements;

Figure 2 is a plan view thereof;

Figure 3 is a semi-diagrammatic view showing application of the marking element;

Figure 4, a plan view of a modified form of marker;

Figure 5, a plan view of a lens with the axis curvature marked, and

Figure 6, a plan view of a lens with axis and cross curve marked.

Similar numerals refer to different parts in the several views.

A pedestal 2 is affixed to the base 3 so as to receive the concave face of a lens blank to be marked, and is provided with a plastic top 4 on which indicia showing the normal axis and cross-curve, as well as cross lines and curves for positioning the bifocal insert.

A pair of marking arms 5 are hinged on pins 6 inserted through lugs 7 at the rear of base 3. These arms are connected by tube 10 to move in unison. The outer portions of the arms curve downward and carry a marking thread or tape 12 which is kept in tension by springs 14 working within grooves 13 in each arm tip. This marking thread may consist of a length of braided fish line, a flat woven tape, or a flat rubber band.

The tips of the arms are positioned so as to carry the tape 12 directly over the center of the pedestal 2, when in fully depressed forward position. When the arms are raised, the thread or tape rolls over and contacts the first inking roller 16 which is provided with a series of flanges 17 formed between corresponding grooves. This contact inks the tape or thread 12 at intervals.

If, however, the arms are pushed backward and upward the tape will contact a second inking roller 20. The ink will then be spread evenly over the entire middle part of the marking tape. The inking rollers both roll in inking troughs 26 so that the lower portions dip into suitable marking ink 25.

If it is desired to make a solid line on the lens, the arms 5 are hinged backward until the tape rolls over both the lower and upper rollers. If a dotted or dashed line is desired the tape is rolled over roller 16 only. Where tape is used, the action is as shown in Figure 3. The tape normally may be in the position shown at 12A in this figure, but as it passes over the roller it flattens out as at 12B thereby inking the side and not the edges of the tape. When thread is used the ink is applied around the entire perimeter of the thread.

In use, the lens 11 is first marked according to the axis curve to be grounded. This may be indicated by a dashed line 41 as shown in Figure 5. It is then rotated on the pedestal 90° and marked for the cross curve as indicated by solid line 42. Optionally two parallel cross curve lines may be made by shifting the lens, slightly parallel to the marking thread. The operational line may then be indicated by the blank space between them.

An alternative form of lens marker is shown in Figure 4. Here an arm 30 in the shape of a bow is pivotly supported at 31 so that it will swing from or toward pedestal 33, and may be raised or lowered slightly. It has a marking thread 36 stretched between the ends of the bow which may be inked by swinging the arm 30 90° clockwise to the inking roller 34 and running it over the surface of the rollers. The bow with the thread inked may then be swung back against the stop 35 to the correct inking position directly over the center of pedestal 33.

In either form I have provided an ink applying thread kept taut between two points of support which can be moved so that the thread can be positioned above the center of the lens or swung to a position where it will engage the inked surface of a roller.

Aside from the two forms shown, there are many other modifications which may be made, all of which, however, would remain within the spirit of the invention. For example, the pedestal 33 may be mounted in the base so that it will turn, while the lens remains in fixed position on it. This might be used to provide for a more accurate positioning of the lens. However, for most marking the lens can be moved on the pedestal, as shown in Figure 1.

Having now fully described my invention and explained its use, I wish to be limited only by the claims.

I claim:

1. A lens marker, comprising in combination, a base having a pedestal adapted to support a lens blank, a swinging thread support on said base having two points of support adapted to maintain said thread taut therebetween, a marking thread stretched between the tips of the arms of said thread support and an inking roller, horizontally journalled, over an inking trough so that the lower portion dips into ink therein, said swinging thread support being adapted to swing from a position with said thread in contact with the upper surface of said inking roller to a position over the center of said pedestal whereby said thread may be brought in contact with a lens blank positioned on said pedestal.

2. A lens marker, including in combination, a base, a pedestal on said base adapted to support a lens blank with its convex side upward and its concave side downward contacting the upper face of said pedestal, indicia marked on the upper face of said pedestal representing the correct positioning of axis and cross-curve lines; a marking tape adapted to transfer marking ink from one or more inking rollers to the upper surface of a lens blank positioned on said pedestal; a pair of marking tape supporting arms hinged to said base, having outer end portions adapted to support said marking tape in taut condition therebetween and to swing from a marking position, with said marking tape over the centers of said pedestal, to an inking position, whereby said marking tape will contact the surface of inking rollers; and inking means on said base including two rollers each journalled over ink containing troughs and each positioned to contact said marking tape successively as said supporting arms swing it away from said marking position; the roller first to be contacted having a surface formed with a series of annular grooves whereby ink is applied intermittently along said marking tape, and the roller contacted thereafter having an uninterrupted smooth surface.

3. In a lens marker having a base, a pedestal adapted to support a lens blank, and inking rollers, the combination therewith of a marking means swingably attached to said base including a tape support consisting of a pair of arms hinged at their inner ends and connected to swing together and bent at their outer ends to form spaced supports for a marking tape, grooves cut in the outer ends of said arms and springs operative therein to attach to and support the ends of a said marking tape whereby it is maintained under tension therebetween, said arms being hinged between said pedestal and said inking rollers so that said marking tape can be swung from contact with said inking roller to contact with a lens positioned on said pedestal.

4. A lens marker, including in combination, a base having a forward end and a rear end, a pedestal on the forward portion thereof having a convex top adapted to support a lens blank thereon with its concave side disposed downward, indicia on said pedestal top indicating axis and cross-curve lines at right angles thereto; a pair of spaced marking arms having thread holding tips at their outer ends, joined to swing in unison and hinged at their inner ends to said base so that, when swung forward said thread holding tips are in alined position with the center of said pedestal; a marking thread extending between the tips of said arms maintained under tension therebetween; a first inking roller on the rear portion of said base disposed upward and rearward from said pedestal, having its surface provided with a series of spaced inking flanges adapted to contact said marking thread and apply ink thereto at intervals; a second inking roller having a smooth surface positioned on said base upward and rearward from said first inking roller; said pedestal, and said inking rollers being arranged so that when said marking arms are swung forward said marking thread is alined with the center of said pedestal, and when swung rearward said marking thread first contacts said first inking roller and receives ink at intervals therefrom, and when swung further rearward said inking thread contacts said second inking roller and receives ink throughout the length of contact.

5. A lens marker, including in combination, a base having a forward end and a rear end, a pedestal on the forward portion thereof having a convex top adapted to support a lens blank thereon with its concave side disposed downward, indicia on said pedestal top indicating axis and cross-curve lines at right angles thereto; a pair of spaced marking arms joined to swing in unison and hinged at their inner ends to the rear portion of said base and having their outer ends curved downward and terminating in grooved thread holding tips; a marking thread stretched between said marking arm tips; and means for applying ink at spaced intervals along said marking tape or continuously therealong, including a first inking roller having a series of inking flanges along its length and a second inking roller having a smooth surface; said pedestal and inking rollers being disposed on said base so that when said marking arms are swung forward said marking thread will extend across the center of said pedestal, and when swung rearward said thread will first contact said first inking roller and receive ink therefrom at intervals along its length and when swung further rearward will contact said second inking roller and receive ink therefrom.

FRANK L. KIDWELL.

REFERENCES CITED

The following references are of record in the file of this patent:

UNITED STATES PATENTS

| Number | Name | Date |
| --- | --- | --- |
| 419,540 | McMains | Jan. 14, 1890 |
| 668,069 | Unger | Feb. 12, 1901 |
| 997,831 | Kiso | July 11, 1911 |
| 1,035,062 | Vroome | Aug. 6, 1912 |
| 1,238,229 | Weiler | Aug. 28, 1917 |
| 1,701,348 | Wright | Feb. 5, 1929 |
| 2,146,599 | Smith | Feb. 7, 1939 |
| 2,178,516 | Brenner | Oct. 31, 1939 |